Patented Sept. 29, 1936

2,056,114

UNITED STATES PATENT OFFICE 2,056,114

METHOD OF FINISHING FIBROUS MATERIAL

Walther Schrauth, Berlin-Dahlem, Germany, assignor, by mesne assignments, to E. I. du Pont de Nemours & Company, Wilmington, Del., a corporation of Delaware No Drawing. Application November 30, 1934, Serial No. 755,418. In Germany October 7, 1930

8 Claims. (Cl. 91—68)

The present invention relates to the treatment of fibrous material and has for an object to provide an improved softening, smoothing and revivifying treatment for natural and artificial fibrous materials including yarns, fabrics, leather and artificial leather.

It has been discovered in accordance with the present invention that a particularly effective treatment for natural and artificial fibrous material is provided when these materials are treated with softening and smoothing baths comprising as principal active ingredients cyclic alcohol esters of high molecular fatty acids, or of cyclic acids such as the mono- and poly-nuclear aromatic, hydro-cyclic, or hetero-cyclic mono-carboxylic acids. Such esters are for example the cyclohexyl ester of palmitic acid, the methyl-cyclohexyl ester of oleic acid, the borneyl or fenchyl ester of cocoanut-oil- or palmkernel-oil-fatty acid, the terpineol ester of naphthenic acid, the cyclohexyl ester of abietic acid, the cyclohexyl or borneyl ester of the montanic acid.

The alcohols used in the preparation of these esters may be any of the cyclic alcohols including the terpene alcohols and their alkyl derivatives, as, for example, terpineol or fenchyl alcohol, the mono- and poly-nuclear aromatic or hydrocyclic alcohols, for example, benzyl-, cyclohexyl-, methyl - cyclohexyl, phenyl - ethyl-, cinnamyl-, etc.- alcohols, the hydro-cyclic alcohols including especially the naphthenic alcohols. The acids used may include the aliphatic saturated, unsaturated and hydroxy acids containing 6 to 30 carbon atoms in the molecule, the naphthenic acids, the mono- and poly-nuclear aromatic acids, as example, benzoic, phenyl-acetic, toluic, and cinnamic acids and the resinic acids as abietic acid and the like. Of the aliphatic acids those containing 6 to 12 carbon atoms are preferred in general but for some special uses those having 12 to 18 carbon atoms produce very satisfactory results.

The several esters may be prepared in accordance with processes which are known and described in the literature. For example, they can be prepared by the direct re-action of the acids with the alcohols by heating a mixture thereof in the presence of sulfuric acid or hydrochloric acid. They can be prepared by re-acting a salt of the acid such as the sodium or potassium salt with a chloride of the alcohol.

For example, to produce the borneol esters of cocoanut oil fatty acids, the fatty acid mixture obtainable by saponifying cocoanut oil is converted in the usual way with phosphorus pentachloride into the corresponding fatty acid chlorides which are purified by means of vacuum distillation. They are then caused to re-act with the appropriate quantity of borneol corresponding to their saponification number. The several terpene alcohol esters of palmkernel oil fatty acids, of cocoanut oil fatty acids or of other fatty acids can be obtained in a similar manner and are suitable for use for the purposes of this invention.

Terpene alcohol esters of the naphthenic acids may be produced as follows:—To one molecular proportion of naphthenic acid is added a little more than one molecular proportion of thionyl chloride and the whole is warmed in a water bath to about 40° C., after which, after distilling off the excess thionyl chloride, naphthenic acid chloride remains. This is then treated in the usual manner at a temperature of about 80–100° C. with the alcohol, terpineol or other terpene alcohol, to form the ester.

The cyclo-hexyl ester of abietic acid may be prepared by heating one molecular proportion of abietic acid ethyl or butyl ester with one molecular proportion of cyclohexyl alcohol in the presence of $\frac{1}{10}$ molecular proportion of sodium metal until ethyl- or butyl alcohol no more distils. The residue left after distillation is washed with water until neutral reaction occurs and then distilled in vacuo.

The material to be finished may conveniently be treated with dispersions of the selected esters in organic solvents, for example, benzene, turpentine, pyridine, hydrogenated naphthalene or in emulsions or in any softening, smoothing, revivifying or other treating material. For the formation of desired emulsions any suitable dispersion agent such as sulfonated oils, sulfonated alcohols, ester salts or xanthogenates of higher molecular alcohols or even soap may be used.

The solvents or the non-solvents with or without such agents as the sulfonated oils or sulfonated alcohols constitute effective dispersion agents inert to the material to be treated in that they have no detrimental action on the fibrous material, leather and the like. After treatment and removal of the solvents or other dispersion agents the materials treated exhibit an extraordinary smoothness and finish. The proposed esters are odorless or substantially so and impart no unpleasant odor but they impart desirable water repellant properties to the materials treated. These properties are desirable and important for wool, cotton, silk and artificial silk, especially the latter.

These same esters are useful as ingredients in impregnation or treating agents of various kinds such, for example, as additions to shoe polishes and polishing waxes to be used where a smoothness and softness of the treated material is desirable.

Furthermore these esters are valuable as ingredients of pigments and of preparations for the surface treatment of metals (lubricating agents) partly because they are entirely neutral and nearly non-saponifiable.

A very high grade revivifying agent may be obtained by combining 20 parts by weight of the methylcyclohexylpalmitic ester with 80 parts of a highly sulfonated Turkey red oil.

A polishing wax may be produced by substituting in the usual compositions cyclohexyl or borneyl ester of the montanic acid for one part of the wax constituents, and a metal cleaning agent may be compounded by mixing 10 parts of the ester of terpineol with naphthenic acid with 50 parts siliceous chalk and 40 parts of a volatile solvent.

These esters are also useful as plasticizing agents in elastic non-brittle lacquer coatings and films and plastic masses made from cellulose esters or ethers and add durability and mechanical resistance as well as flexibility. It may be noted that by using the new agents cellulose ester and ether lacquers can be produced which contain in addition to the usual materials also a certain amount of caoutchouc and that thereby the strength and flexibility and the extensibility may be considerably increased.

For example, 5 parts of nitrocellulose are dissolved in 29 parts of butylacetate and 11 parts of ethyl alcohol and mixed together with 4 parts of the ester formed by heating methylcyclohexanol with palmitic acid. After pouring and evaporating a soft and homogeneous film is obtained.

In the preceding example the nitrocellulose might be replaced by other esters of cellulose, if by means of a proper combination of the solvent components a premature separation in flakes is avoided. The methylcyclohexylpalmitate can be replaced by the other above-mentioned esters, for example, by terpineol ester of the fatty acids as obtained from cocoanut oil or palmkernel oil, or the borneyl ester of naphthenic acid.

Plastic masses, possessing the properties of the basic substances, i. e. the softness of the nitrocellulose products and the plasticizing properties of the caoutchouc are produced according to the following prescription:

| | Parts |
|---|---|
| Nitrate of cellulose | 3 |
| Hevea crepe | 1 |
| Butylacetate | 30 |
| Cyclohexanone | 15 |
| Cyclohexylacetate | 5 |
| One of the above mentioned esters | 7 |

The mixture is dissolved by heating up to 70° homogeneously and afterwards dried in a suitable manner.

Some of the several esters mentioned have among themselves special characteristics rendering them particularly suitable for certain uses.

For treating fibrous material a mixture is suitable consisting of 80 parts of the methyl cyclohexyl ester of oleic acid and 20 parts of soap containing 60 parts of oleate of potash and 40 parts of methyl cyclohexyl alcohol. An aqueous emulsion containing 5 percent of the above mixture is a particularly effective revivifying bath for fibrous materials such as rayon or artificial silk.

A leather varnish which is suitable for the manufacture of artificial leather is produced according to the following prescription:

| | Parts |
|---|---|
| Nitrate of cellulose | 7 |
| Butyl acetate | 30 |
| Amyl acetate | 15 |
| Toluene | 30 |
| Acetanilide | 1 |
| Methylcyclohexyl ester of palmitic acid | 3 |
| Di-methylcyclohexyl-ester of methyl-adipic acid | 2 |

A textile fabric such as shirting is in the usual manner spread over several times with the above mixture. It is possible to employ a large quantity of the mixture, because it is not adhering and furnishes a very smooth product.

The foregoing application is a continuation in part of applicant's co-pending application Serial No. 567,309 filed October 6th, 1931.

What I claim is:—

1. The method of treatment of fibrous material or metal and wood surfaces which consists in applying thereto, treating material consisting of an ester of the group consisting of the borneyl and fenchyl esters of cocoanut oil and palmkernel oil-fatty acid, the terpineol ester of naphthenic acids, the cyclohexyl ester of abietic acid, and the cyclohexyl and borneyl esters of montanic acid.

2. The method of treatment of fibrous material or metal and wood surfaces which consists in applying thereto, treating material containing as a principal ingredient the methylcyclohexyl ester of abietic acid.

3. The method of treatment of fibrous material or metal and wood surfaces which consists in applying thereto, treating material containing as a principal ingredient the borneyl ester of cocoanut oil-fatty acid.

4. The method of treatment of fibrous material or metal and wood surfaces which consists in applying thereto, treating material containing as a principal ingredient the terpineol ester of naphthenic acid.

5. A composition for treating fibrous material which consists of an ester selected from the group consisting of the borneyl and fenchyl esters of cocoanut-oil and palmkernel oil fatty acid, the terpineol ester of naphthenic acid, the cyclohexyl ester of abietic acid, and the cyclohexyl and borneyl esters of montanic acid.

6. A composition for treating fibrous material comprising as its principal active ingredient the methyl cyclohexyl ester of abietic acid.

7. A composition for treating fibrous material comprising as its principal active ingredient the borneyl ester of cocoanut oil fatty acid.

8. A composition for treating fibrous material comprising as its principal active ingredient the terpineol ester of naphthenic acid.

WALTHER SCHRAUTH.